(12) United States Patent
Bergan

(10) Patent No.: US 8,784,114 B2
(45) Date of Patent: Jul. 22, 2014

(54) INTERACTIVE COMPUTER SYSTEM FOR INSTRUCTOR-STUDENT TEACHING AND ASSESSMENT OF PRESCHOOL CHILDREN

(71) Applicant: Assessment Technology Incorporated, Tucson, AZ (US)

(72) Inventor: David W. Bergan, Tucson, AZ (US)

(73) Assignee: Assessment Technology, Inc., Tucson, AZ (US)

( * ) Notice: Subject to any disclaimer, the term of this patent is extended or adjusted under 35 U.S.C. 154(b) by 0 days.

(21) Appl. No.: 13/953,207

(22) Filed: Jul. 29, 2013

(65) Prior Publication Data

US 2013/0316325 A1 Nov. 28, 2013

Related U.S. Application Data

(63) Continuation of application No. 11/009,708, filed on Dec. 13, 2004, now Pat. No. 8,529,270.

(60) Provisional application No. 60/528,705, filed on Dec. 12, 2003.

(51) Int. Cl.
*G09B 3/00* (2006.01)
*G09B 19/00* (2006.01)

(52) U.S. Cl.
USPC ............ 434/322; 434/323; 434/308; 434/167

(58) Field of Classification Search
USPC ......... 434/156, 167, 236, 322, 323, 350, 362, 434/365
See application file for complete search history.

(56) References Cited

U.S. PATENT DOCUMENTS

| | | | |
|---|---|---|---|
| 4,967,354 | A | 10/1990 | Buchanan |
| 5,059,127 | A | 10/1991 | Lewis |
| 5,122,952 | A | 6/1992 | Minkus |
| 5,173,051 | A | 12/1992 | May |
| 5,174,759 | A | 12/1992 | Preston |
| 5,261,823 | A | 11/1993 | Kurokawa |
| 5,267,865 | A | 12/1993 | Lee |

(Continued)

OTHER PUBLICATIONS

Foley, Jim. Integrating Computer Technology, People Technology and Application Technology: Strategies and Case Studies from Georgia Tech's Graphic, Visualization and Usability Center, Proceeding of the Workshop on Advanced Visual Interfaces, 1994, pp. 34-43.

(Continued)

*Primary Examiner* — Peter Egloff
(74) *Attorney, Agent, or Firm* — Stolowitz Ford Cowger LLP

(57) ABSTRACT

A computer system contains and displays a cartoon-like story with a plurality of displayed components (such as cartoon characters, play items, etc.) recognizable by a preschool student on a first portion of the display screen along with an accompanying voice message on the speaker. Written instructions for teachers to follow in a personal one-to-one interaction with one or more students are displayed on a second portion of the display screen. For some activities, the student may actually respond using the computer such as by touching a touch screen or using a mouse to select one of the displayed components in response to a request to select a displayed component having a predetermined aspect. For other activities the teacher enters the response of the student as observed by the teacher. When one or more correct responses are entered by the student or teacher, achievement of a goal can automatically be entered into the educational management system.

8 Claims, 14 Drawing Sheets

(56) References Cited

U.S. PATENT DOCUMENTS

| | | | |
|---|---|---|---|
| 5,295,836 A | 3/1994 | Ryu | |
| 5,310,349 A | 5/1994 | Daniels | |
| 5,326,270 A | 7/1994 | Ostby | |
| 5,411,271 A | 5/1995 | Mirando | |
| 5,537,587 A | 7/1996 | Kelley | |
| 5,558,520 A | 9/1996 | Werzberger | |
| 5,727,950 A | 3/1998 | Cook | |
| 5,730,604 A | 3/1998 | Jay | |
| 5,743,746 A | 4/1998 | Ho | |
| 5,779,486 A | 7/1998 | Ho | |
| 5,823,788 A | 10/1998 | Lemelson | |
| 5,823,789 A | 10/1998 | Jay | |
| 5,829,983 A | 11/1998 | Koyama | |
| 5,835,758 A | 11/1998 | Nochur | |
| 5,864,869 A | 1/1999 | Doak | |
| 5,893,717 A | 4/1999 | Kirsch | |
| 5,904,485 A | 5/1999 | Siefert | |
| 5,967,793 A | 10/1999 | Ho | |
| 6,024,577 A | 2/2000 | Wadahama | |
| 6,029,043 A | 2/2000 | Ho | |
| 6,030,226 A * | 2/2000 | Hersh | 434/236 |
| 6,042,384 A | 3/2000 | Loiacono | |
| 6,044,387 A | 3/2000 | Angiulo | |
| 6,077,085 A | 6/2000 | Parry | |
| 6,091,930 A | 7/2000 | Mortimer | |
| 6,112,049 A | 8/2000 | Sonnenfeld | |
| 6,118,973 A | 9/2000 | Ho | |
| 6,120,300 A | 9/2000 | Ho | |
| 6,139,330 A | 10/2000 | Ho | |
| 6,149,441 A | 11/2000 | Pellegrino | |
| 6,202,060 B1 | 3/2001 | Tran | |
| 6,261,103 B1 | 7/2001 | Stephens | |
| 6,263,434 B1 | 7/2001 | Hanna | |
| 6,269,355 B1 | 7/2001 | Grimse | |
| 6,305,942 B1 | 10/2001 | Block | |
| 6,315,572 B1 | 11/2001 | Owens | |
| 6,322,366 B1 | 11/2001 | Bergan | |
| 6,341,212 B1 | 1/2002 | Shende | |
| 6,353,447 B1 | 3/2002 | Truluck | |
| 6,364,666 B1 * | 4/2002 | Jenkins et al. | 434/156 |
| 6,418,298 B1 | 7/2002 | Sonnenfeld | |
| 6,468,085 B1 | 10/2002 | Bergan | |
| 6,496,681 B1 | 12/2002 | Linton | |
| 6,498,920 B1 | 12/2002 | Simon | |
| 6,505,031 B1 | 1/2003 | Slider | |
| 6,535,713 B1 | 3/2003 | Houlihan | |
| 6,547,568 B1 | 4/2003 | Yamano | |
| 6,554,618 B1 | 4/2003 | Lockwood | |
| 6,561,812 B1 | 5/2003 | Burmester | |
| 6,592,379 B1 | 7/2003 | Stuppy | |
| 6,676,413 B1 | 1/2004 | Best | |
| 6,685,478 B2 | 2/2004 | Ho et al. | |
| 6,769,915 B2 | 8/2004 | Murgia | |
| 6,773,266 B1 | 8/2004 | Dornbush | |
| 6,789,047 B1 | 9/2004 | Woodson | |
| 6,793,129 B2 | 9/2004 | Wood | |
| 6,904,263 B2 | 6/2005 | Grudnitski | |
| 7,031,651 B2 | 4/2006 | McCormick | |
| 7,065,516 B1 | 6/2006 | Bergan | |
| 7,165,012 B2 | 1/2007 | Swanson | |
| 7,311,524 B2 | 12/2007 | Jennen | |
| 7,362,997 B2 | 4/2008 | Hartenberger | |
| 8,529,270 B2 | 9/2013 | Bergan | |
| 2001/0034016 A1 | 10/2001 | Ziv-el | |
| 2001/0039000 A1 | 11/2001 | Parson | |
| 2001/0049085 A1 * | 12/2001 | Wasowicz | 434/167 |
| 2002/0076675 A1 * | 6/2002 | Budra et al. | 434/167 |
| 2002/0177109 A1 | 11/2002 | Robinson | |
| 2002/0192631 A1 | 12/2002 | Weir | |
| 2002/0199118 A1 | 12/2002 | Yardley | |
| 2003/0017442 A1 | 1/2003 | Tudor | |
| 2003/0027121 A1 | 2/2003 | Grudnitski | |
| 2003/0039949 A1 | 2/2003 | Cappellucci | |
| 2003/0044762 A1 | 3/2003 | Bergan | |
| 2003/0180703 A1 | 9/2003 | Yates | |
| 2004/0002039 A1 | 1/2004 | Draper | |
| 2004/0002049 A1 | 1/2004 | Beavers | |
| 2004/0063085 A1 | 4/2004 | Ivanir | |
| 2004/0076942 A1 * | 4/2004 | O'Neil et al. | 434/350 |
| 2004/0115608 A1 | 6/2004 | Meyer | |
| 2004/0219504 A1 | 11/2004 | Hattie | |
| 2004/0229199 A1 | 11/2004 | Ashley | |
| 2005/0110461 A1 | 5/2005 | McConnell | |
| 2005/0114160 A1 | 5/2005 | Boehme et al. | |
| 2005/0125196 A1 | 6/2005 | Swanson | |
| 2005/0130113 A1 | 6/2005 | Bergan | |
| 2005/0170325 A1 | 8/2005 | Steinberg | |
| 2005/0250087 A1 | 11/2005 | Driscoll | |
| 2006/0003306 A1 | 1/2006 | McGinley | |
| 2006/0046237 A1 | 3/2006 | Griffin | |
| 2006/0078863 A1 | 4/2006 | Coleman | |
| 2006/0172274 A1 | 8/2006 | Nolasco | |
| 2006/0199163 A1 | 9/2006 | Johnson | |
| 2006/0216683 A1 | 9/2006 | Goradia | |
| 2006/0294552 A1 | 12/2006 | Swanson | |
| 2007/0099169 A1 | 5/2007 | Beamish | |
| 2007/0111180 A1 | 5/2007 | Sperle | |
| 2007/0122788 A1 | 5/2007 | Stevens, Jr. | |
| 2007/0160969 A1 | 7/2007 | Barton | |
| 2007/0178432 A1 | 8/2007 | Davis | |
| 2008/0038705 A1 | 2/2008 | Kerns | |
| 2008/0040502 A1 | 2/2008 | Holsberry | |
| 2008/0187893 A1 | 8/2008 | Blaustein | |
| 2009/0162827 A1 | 6/2009 | Benson | |
| 2009/0164406 A1 | 6/2009 | Benson | |
| 2011/0200978 A1 | 8/2011 | Bergan | |
| 2011/0200979 A1 | 8/2011 | Benson | |
| 2013/0316325 A1 | 11/2013 | Bergan | |

OTHER PUBLICATIONS

Kelly et al., Qualitative Observations from Software Code Inspection Experiments, IBM Centre for Advance Studies Conference, 2002, p. 5.

Villiers De Ruth. Usability evaluation of an e-learning tutorial: Criteria, Questions and Case Study, ACM International Conference Proceedings Series; vol. 75, 2004, p. 284-291.

Thissen et al., "Item Response Theory for Scores on Tests including Polychotomous Items with Ordered Response," The L.L. Thurstone Psychometric Laboratory, University of North Carolina, Research Report No. 94-2, May 1994.

Clive Thompson, "How Khan Academy is Changing the Rules of Education," Wired Aug. 2011, http://www.wired.com/magazine.2011/07/ff_khan/all/1. Downloaded Jul. 18, 2011.

Stolowitz Ford Cower LLP List of Related Matters dated Sep. 5, 2013; 1 page.

Stolowitz Ford Cowger LLP List of Related Matters dated Apr. 24, 2014; 1 page.

* cited by examiner

Select the knowledge area to show all animated activities that assess at least one goal in the knowledge area. Click the checkbox next to the activities you wish to assess with.

Select Scale  3 -5:    v2 Language and Literacy ▼ — 88

Select Knowledge Area  LISTENING AND UNDERSTANDING - RECEPTIVE VO ▼ — 90

[ Next > ] — 108

92 — LISTENING AND UNDERSTANDING - RECEPTIVE VOCABULARY

| | Animated Activity | Description | Goals |
|---|---|---|---|
| ☐ | Argus' Toy Play | The child follows the characters as they play in the park. Addresses possessive and rhyming words. Teacher controls the mouse at all time, some scoring with keyboard. Both computerized scoring and teacher assessment are used. | 11) Understands pronouns (e.g., she, he, it). |
| ☐ | Guess the Action | The child participates in a game show. Addresses action words & negative words. Teacher or child can control the mouse. Computerized scoring. Child must score 3/3 in each round for mastery. | 07) Understands action words (e.g., give, run). 08) Understands negative words (e.g., not, no). |
| ☑ (94) | Guess the Action: Descriptive and Positional Words | The child participates in a game show that addresses positional words & adjectives. Either the teacher or the child can control the mouse. Computerized scoring. Child must score 3/3 in each round for mastery. | 09) Understands positional words (e.g., top, bottom, on, in). 10) Understands words that describe the qualities of objects (e.g., soft, cold). |
| ☐ | Guess the Action: Past and Future Tense | The Child participates in a game show. Addresses past and future tense. Teacher or child can control the mouse. Computerized scoring. Child must score 3/3 in each round for mastery. | 12) Understands past and future tense (e.g., went, will). |

CHILDREN'S ACTIVITY MENU: Select the scale. Click the Start Child Menu button.
STORYTELLER ACTIVITIES: Select the scale and knowledge area (if desired) to show all animated activities. Click the checkbox next to the activates you wish to view. Click the Start Storyteller button.

Select Sale [3-5: Galileo v2 Language and Literacy ▼] — 184
Select knowledge Area [PHONOLOGICAL AWARENESS - SOUND RECONGNITI ▼] — 186

 Print name tags — 192

[Start Child Menu]                                              [Start]

PHONOLOGICAL AWARENESS - SOUND RECOGNITION

|   | Animated Activity | Description | Goals |
|---|---|---|---|
| ☐ | Going to Town | Follow Trixie and Sebastian through their adventure to get to town. Animated story followed by questions to encourage child's verbal expression. | 33) Recognizes rhymes in poems, readings, or conversation, most of the time. |
| ☐ | Lettercard Concentration | Find matching letter sounds in this concentration game. Three levels of play are available: 3 pairs with visual cues and letter sounds, 6 pairs with visual cues and letter sounds, and 4 pairs with letter sounds only. | 28) Recognizes matching and dissimilar sounds (consonants and vowels). |
| ☐ | Magic Mixing Bowl | Belle's Magic Mixing Bowl turns phonemes into words. Help her gather two or three sounds and watch her mix the sounds together. | 35) Puts sounds together to make short words (e.g., k-a-t, cat). |
| ☑ —198 | Word Spell | Argus, dressed as a magician, is performing on stage. He shows the audience an object and a box with the object's name on it. Argus directs the audience to click on each of the letters and listen to the letter sound (these will all be CVC words, such as cat, dog, pig,). Once all the letters have been clicked, Argus changes one of the letters of the word to make it a new word. The child will have an opportunity to sound out the new word and guess what it is. | 29) Distinguishes between some beginning consonant sounds in spoken language. 30) Distinguishes between some ending consonant sounds in spoken language. 32) Distinguishes between some vowel sounds in spoken language. 35) Puts sounds together to make short words (e.g., k-a-t, cat). 36) Segments short words into their component sounds (e.g., trick, t-r-i-k). |

188

Selected Animated Activities (double click to remove)

| Word Spell |
|---|
| |

[Start]

FIG. 18

INTERACTIVE COMPUTER SYSTEM FOR INSTRUCTOR-STUDENT TEACHING AND ASSESSMENT OF PRESCHOOL CHILDREN

RELATED APPLICATIONS

This application is a continuation and claims priority to U.S. application Ser. No. 11/009,708 filed on Dec. 13, 2004, which claims the benefit of provisional application No. 60/528,705 filed Dec. 12, 2003, all of which are hereby incorporated herein in their entirety by reference.

CROSS-REFERENCE TO RELATED APPLICATIONS

This application is related to U.S. patent application Ser. No. 09/338,440 filed Jun. 23, 1999, now U.S. Pat. No. 6,322,366, U.S. patent application Ser. No. 09/558,060 filed Apr. 26, 2000, U.S. patent application Ser. No. 09/628,806 filed Jul. 28, 2000, now U.S. Pat. No. 6,468,085, U.S. patent application Ser. No. 10/228,962 filed Aug. 28, 2002 and U.S. provisional patent application 60/528,705 filed Dec. 12, 2003 and all of which applications and patents are hereby incorporated herein in their entirety by reference.

COPYRIGHT NOTICE

© 2002-2003 Assessment Technology, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

BACKGROUND OF THE INVENTION

The present invention relates to computer systems used for the instruction of younger students, namely preschool children such as ages 3-5, and the assessment of the achievement of such students.

Many computer based systems have been developed to provide improvement in education of students in schools. Some computer systems provide lessons or tests for students to learn and often these systems automatically assess the achievement of the students upon completion of a lesson or test. Also computer systems are employed by teachers to compose, copy or modify tests, lessons or lesson plans.

However in the instruction of young children, such as preschool and the early grades, the children generally lack sufficient computer skills to effectively interact with prior art education computer systems. Thus there is a need for improved computer systems in the instruction of younger children.

Thus Hofer does not teach capturing address candidates and using addressee name information to automatically disambiguate among those candidates.

SUMMARY OF THE INVENTION

The present invention utilizes a computer system which contains and displays a cartoon-like story with a plurality of displayed components (such as cartoon characters, play items, etc.) recognizable by a preschool student on a first portion of the display screen along with an accompanying voice message on the speaker. Written instructions for teachers to follow in a personal one-to-one interaction with one or more students are displayed on a second portion of the display screen. For some activities, the student may actually respond using the computer such as by touching a touch screen or using a mouse to select one of the displayed components in response to a request to select a displayed component having a predetermined aspect. For other activities the teacher enters the response of the student as observed by the teacher. When one or more correct responses are entered by the student or teacher, achievement of a goal can automatically be entered into the educational management system such as that disclosed in the incorporated patents and applications.

An object of the invention is to provide computer based instructional activities that include both teacher-facilitated and independent learning options. In the teacher-facilitated option, the computer provides on-screen instructions, which facilitates a three-way interaction involving the child, the teacher, and instructional material. The computer provides stimulus presentations and instructions to the child enabling independent learning by the child. In addition, it offers on-screen prompts to the teacher facilitating teacher-child interaction. The teacher-facilitated option paves the way for the independent learning option, in which the child interacts with the computer without the presence of the teacher.

Other objects, advantages and feature of the invention will be apparent from the following detailed description of the invention and/or accompanying drawings.

Additional aspects and advantages of this invention will be apparent from the following detailed description of preferred embodiments, which proceeds with reference to the accompanying drawings.

BRIEF DESCRIPTION OF THE DRAWINGS

FIG. 6 is a view of a second screen displayed by the procedure of FIG. 4.

FIG. 18 is a view of a screen display in the procedure of FIG. 17.

DETAILED DESCRIPTION OF PREFERRED EMBODIMENTS

Figure 1:
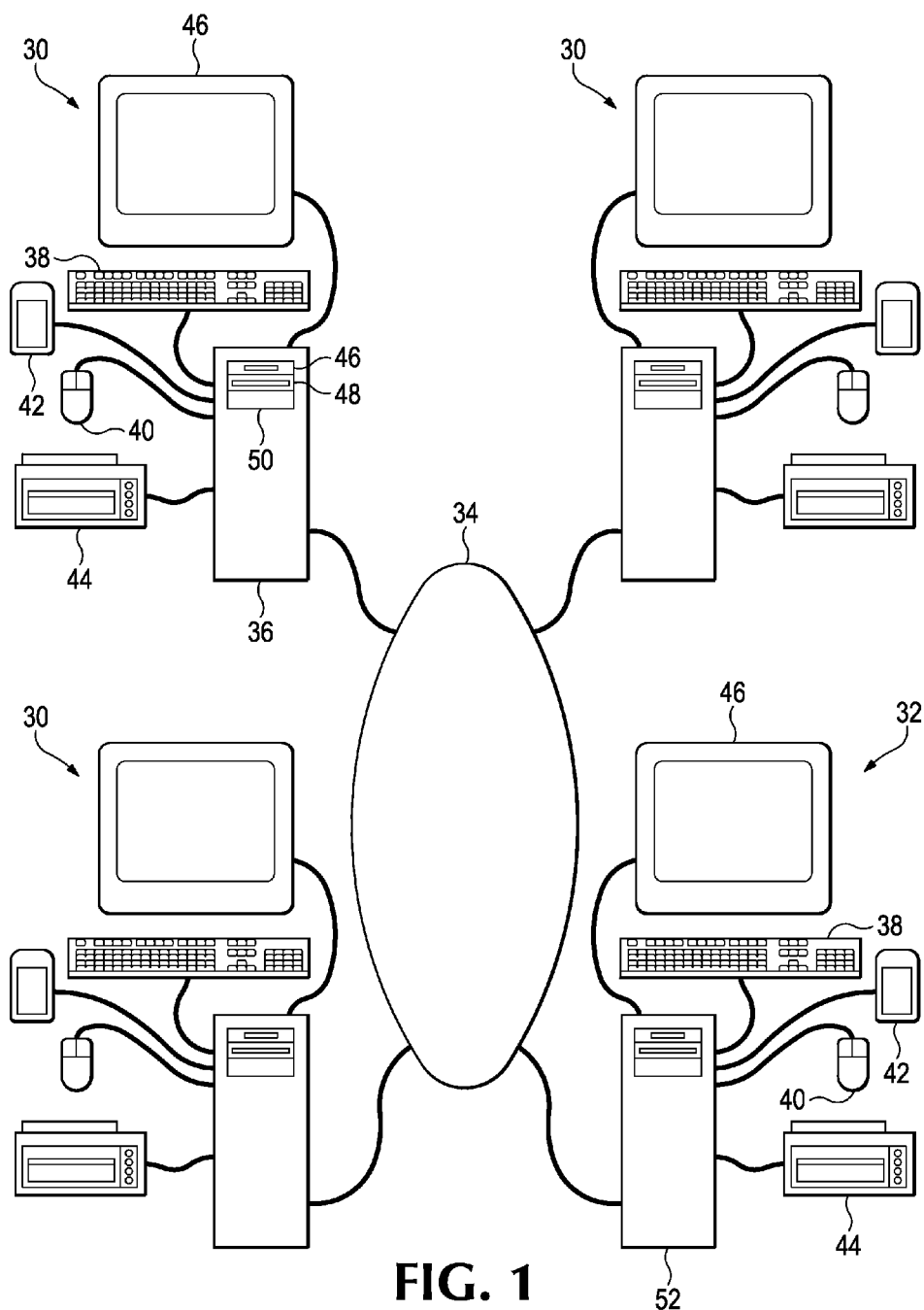
FIG. 1 is a diagram of a computer system which can be utilized by the invention.

As shown in FIG. 1, an interactive computer system for instructor-student teaching and assessment of preschool children in accordance with one embodiment of the invention is employed in a computer network having a plurality of computer stations 30 along with a server station 32 interconnected by a network 34. Each computer station 30 typically includes a central processing unit 36 which is connected to a keyboard 38, a mouse 40, a monitor 46, a speaker 42 and a printer 44. The central unit 36 typically includes a read/write removable media device such as floppy disk drive 46, a read only removable media device such as a CD-ROM or DVD reader (or reader/writer) 48 and a mass storage device such as a hard drive 50. The server station 32 is similar to the computer stations but has a server unit 52 which contains storage units for holding a large quantity of files which are accessed by the computer stations 30 through the network 34.

The network 34 in one preferred embodiment is the world wide web (sometimes called the internet) but could alternatively be one of a variety of other possible network configurations. Where the educational management system is employed in a single school or closely distanced schools, the network 34 can be a hardwired internal network or connected through dedicated lines (sometimes called an intranet).

Figure 2:
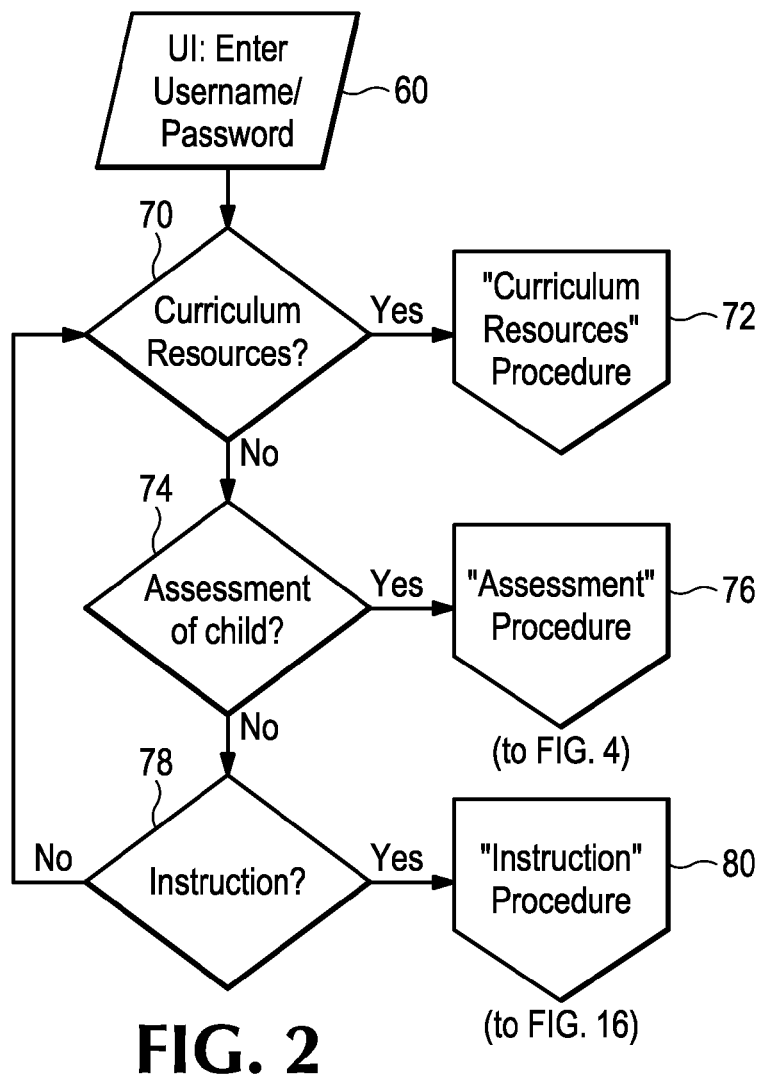
FIG. 2 is a step diagram of an initial portion of a program for controlling operation of one of the computers in the system of FIG. 1 in accordance with the invention.
Figure 3:
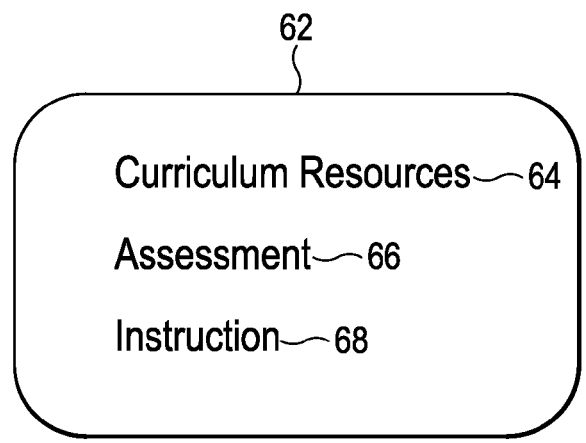
FIG. 3 is a view of a message displayed on a monitor of the computer by the initial program procedure of FIG. 2
Figure 4:
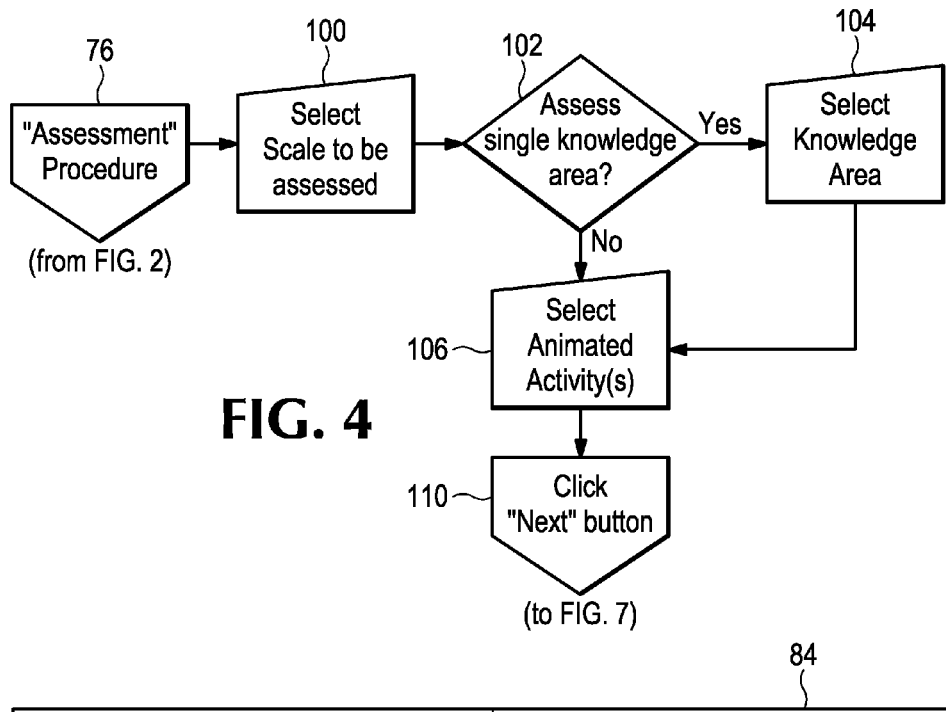
FIG. 4 is a step diagram of a first portion of an assessment procedure called by the program of FIG. 2.
Figure 11:
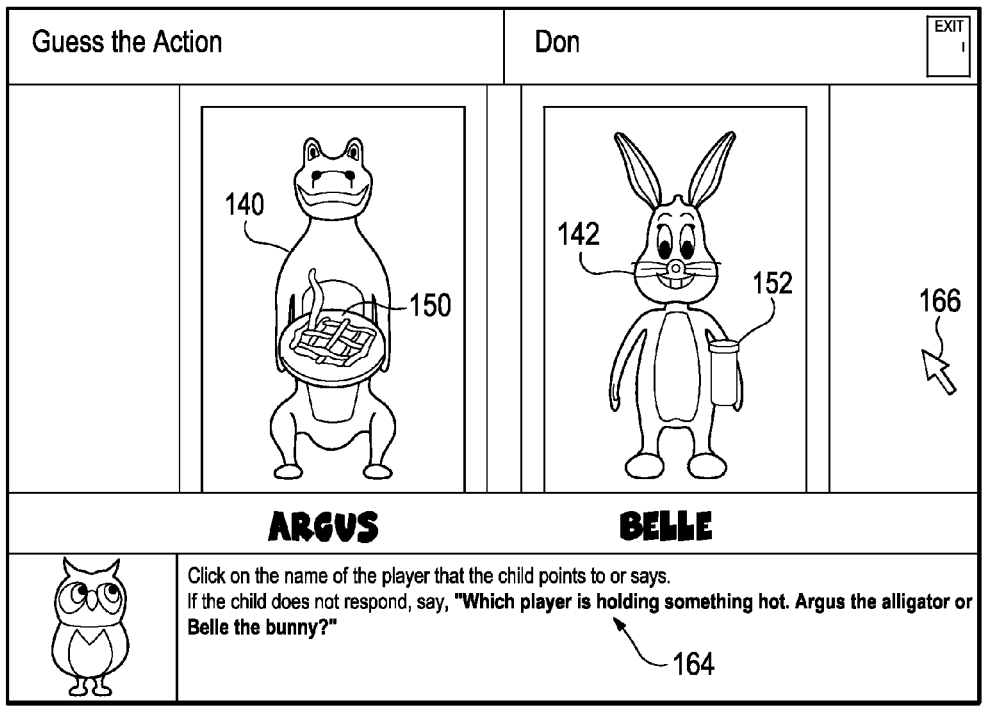
FIG. 11 a view of a second screen displayed during operation of an assessment activity called in the assessment procedure.
Figure 12:
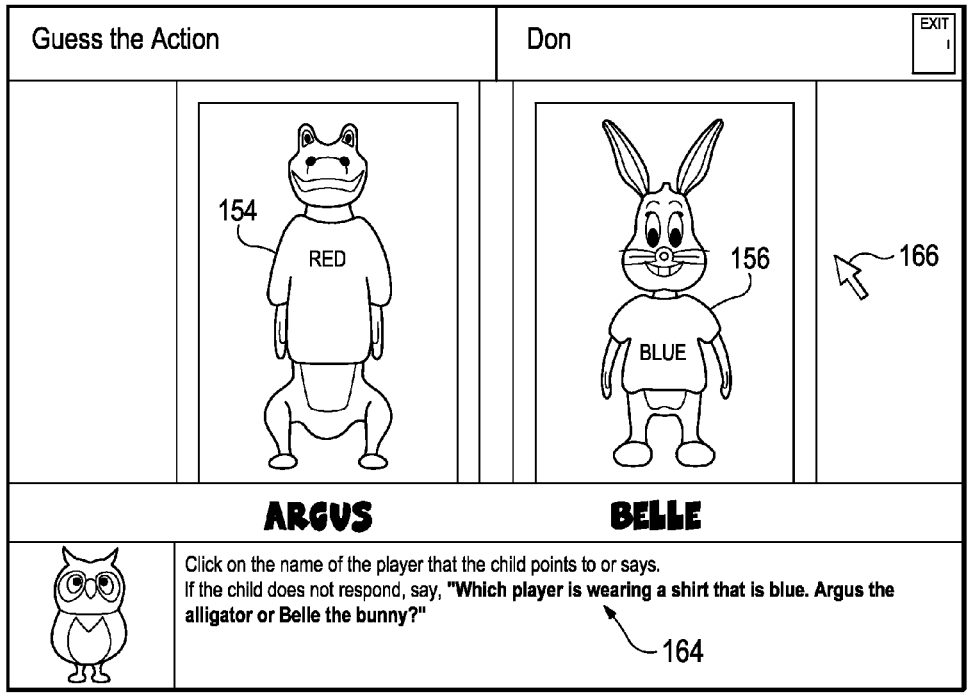
FIG. 12 a view of a third screen displayed during operation of an assessment activity called in the assessment procedure.
Figure 13:
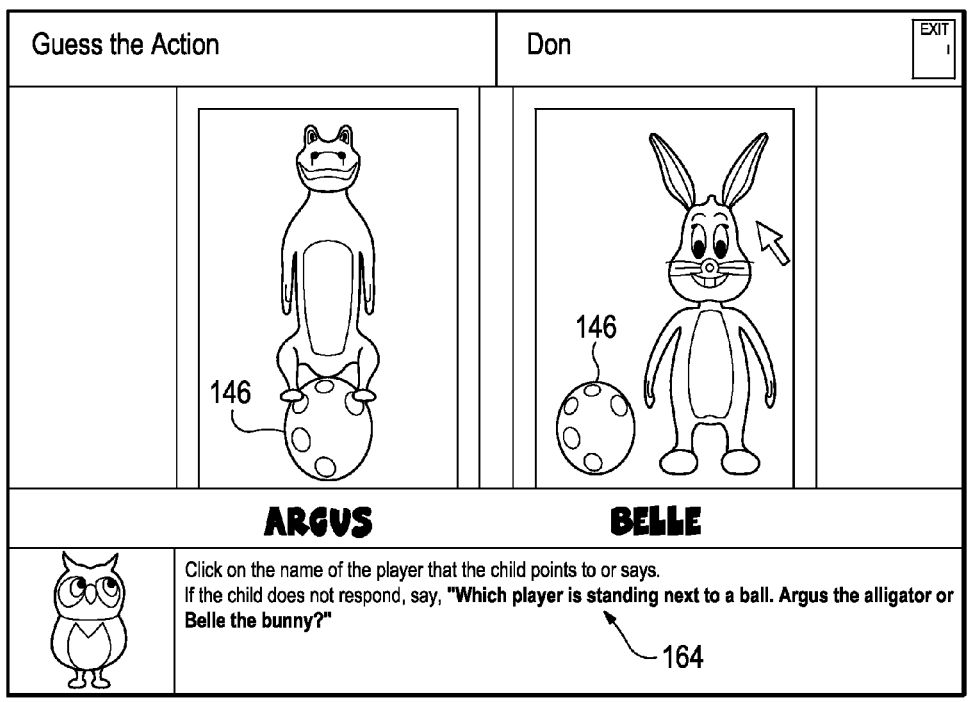
FIG. 13 a view of a fourth screen displayed during operation of an assessment activity called in the assessment procedure.
Figure 14:
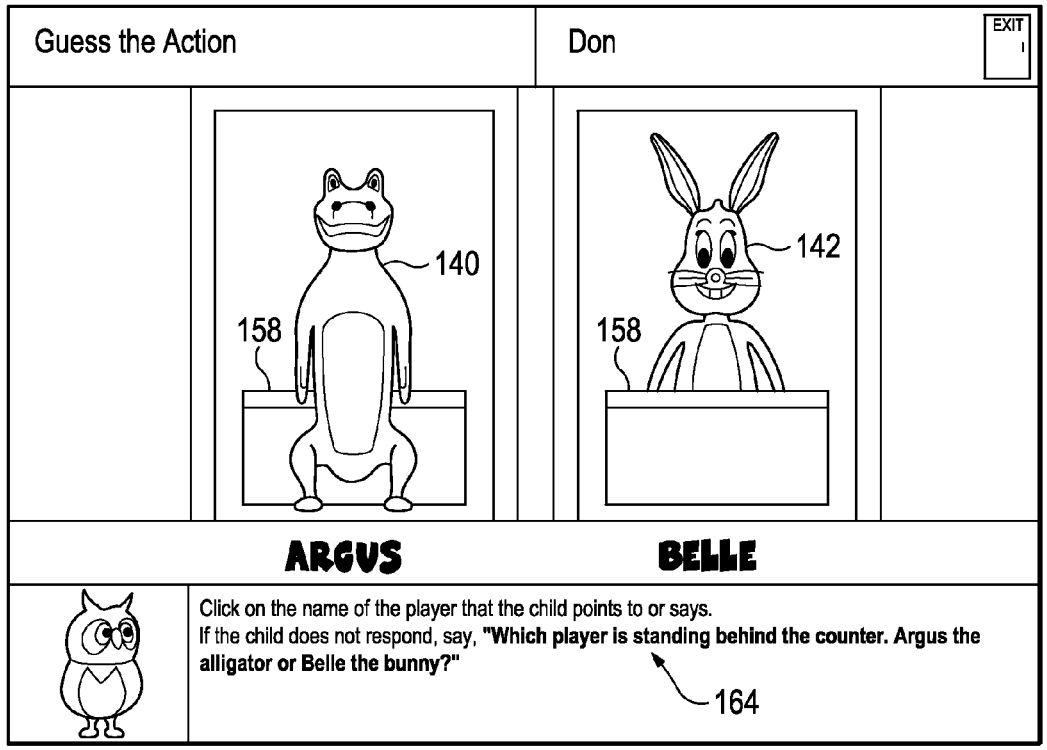
FIG. 14 a view of a fifth screen displayed during operation of an assessment activity called in the assessment procedure.
Figure 15:
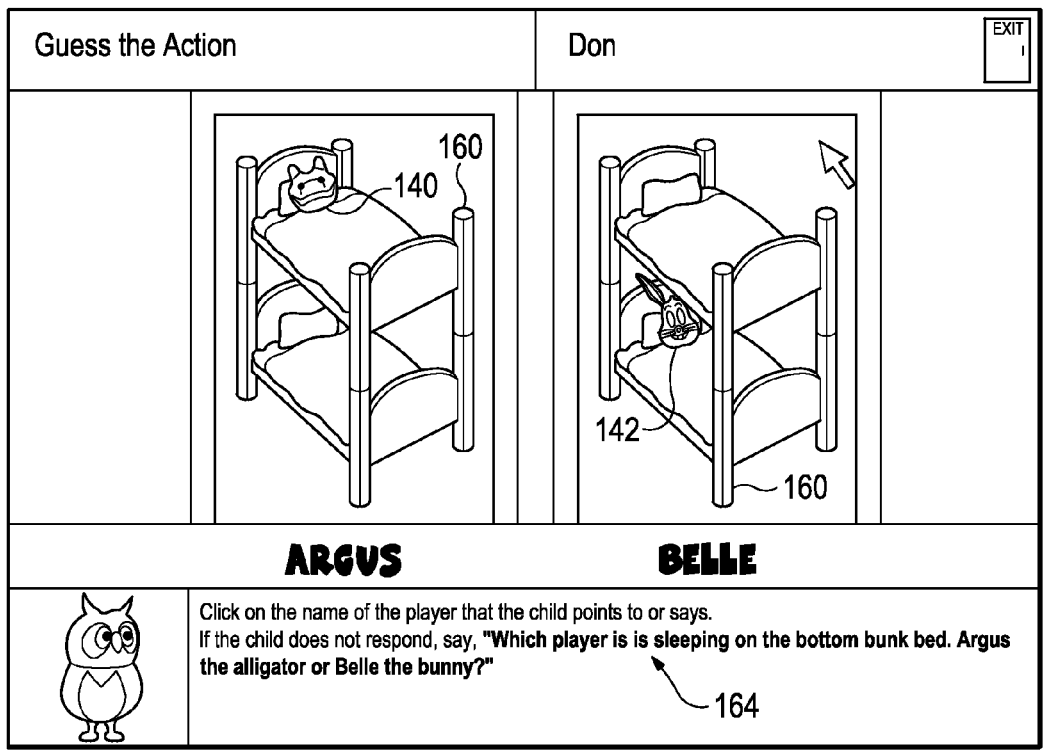
FIG. 15 a view of a sixth screen displayed during operation of an assessment activity called in the assessment procedure.
Figure 16:
FIG. 16 a view of a screen reporting achievement at the end of operation of an assessment activity called in the assessment procedure.

The interactive computer system for instructor-student teaching and assessment of preschool children is formed by one or more software programs which control and operate the computers 30 and server 32. In the program shown in FIG. 2, the user enters a user name and password to gain access to the program. Next the window of FIG. 3 is displayed with options "curriculum resources" 64, "assessment" 66 and "instruction" 68 for the user to select. In step 70 if the user selects "curriculum resources" the program calls a curriculum resources procedure 72 in which the user can retrieve documents, background information, support information, and other information about the invention. If assessment 66 is selected, step 74 branches to the assessment procedure 76 of FIGS. 4, 7 and 11 and if instruction 68 is selected, step 78 branches to the instruction procedure 80 of FIG. 16.

Figure 5:
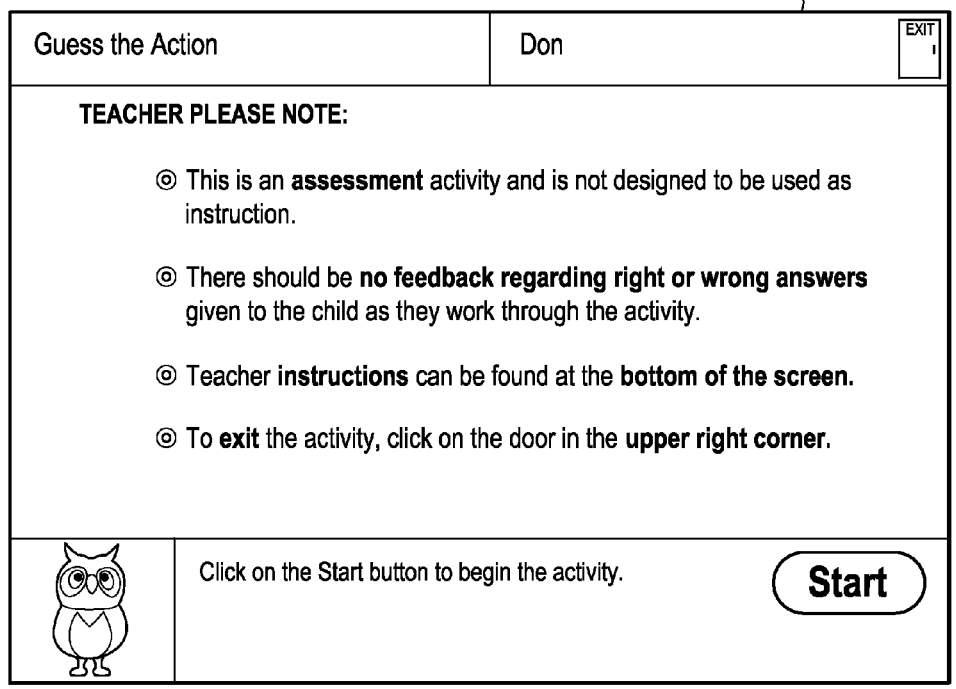
FIG. 5 is a view of a first screen displayed by the procedure of FIG. 4.

In the assessment procedure 76, the window 84, FIG. 5, is initially displayed to instruct the teacher that no feedback regarding right or wrong answers should be given to the student during the assessment procedure. Next the window 86, FIG. 6, is displayed. This window 86 contains a scale selection window 88, a knowledge area selection window 90 and a window 92 listing the animated activities, descriptions of the corresponding activities and the goals to be achieved by the corresponding activities along with check boxes 94 by which the user can select a particular animated activity of assessment. After the user has selected the scale to be assessed in step 100 it is determined if the user has elected to assess a single knowledge area in step 102. Selection of a single knowledge area in step 104 reduces the number of activities displayed in window 92 to those activities relating to the selected single knowledge area instead of a listing of all activities relating to the selected scale. In step 106, the user clicks on one of the check boxes 94 to select an animated activity for child assessment. Clicking on the next button 108 in FIG. 6 calls the next procedure 110 in FIG. 7.

Figure 7:
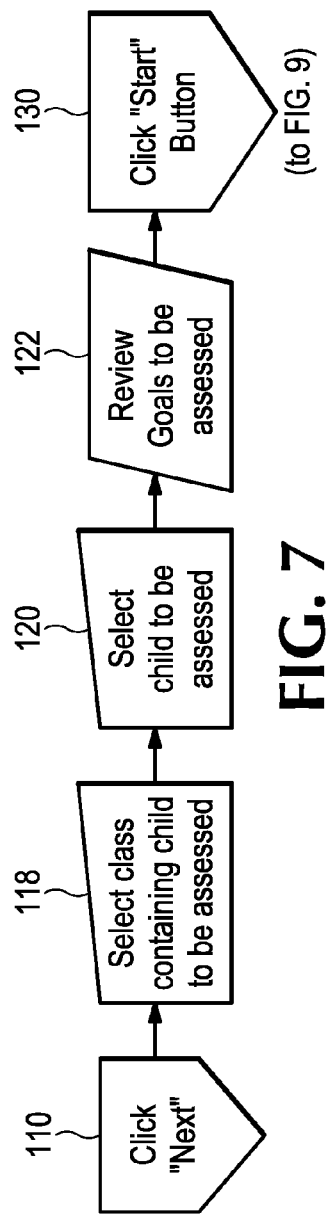
FIG. 7 is a step diagram of a second portion of the assessment procedure following completion of the procedure of FIG. 4.
Figure 8:
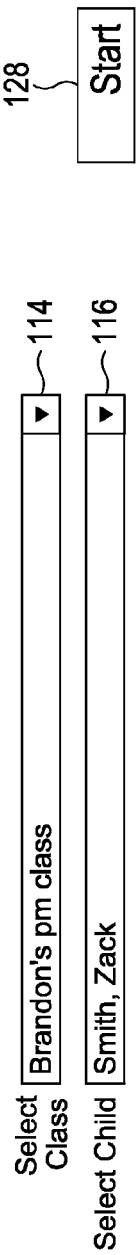
FIG. 8 is a view of a window displayed in the second portion of the assessment procedure of FIG. 7.
Figure 9:
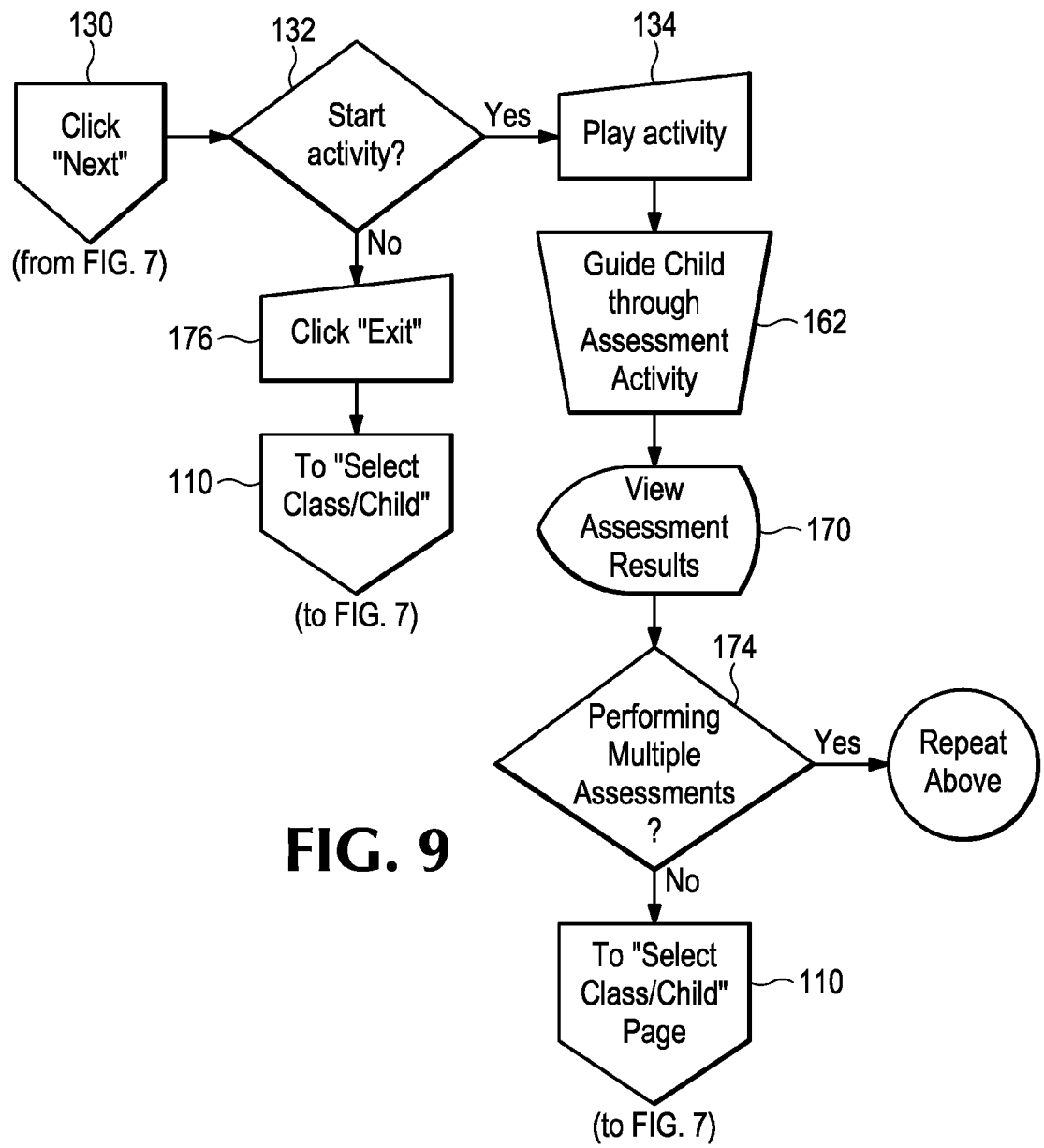
FIG. 9 is a step diagram of a third portion of the assessment procedure and which is called by FIG. 7.
Figure 10:
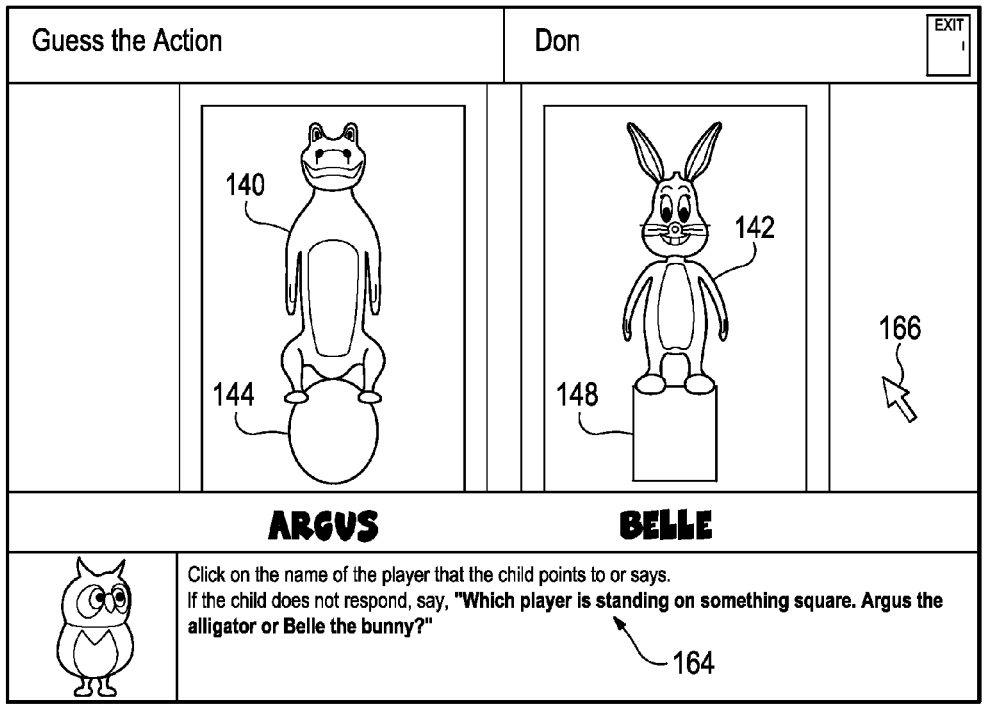
FIG. 10 a view of a first screen displayed during operation of an assessment activity called in the assessment procedure.

In the second portion of the assessment procedure 110 of FIG. 7, the window 112 of FIG. 8 is displayed. This window contains a class selection window 114 and a child selection window 116. The user in step 118 uses the window 114 to select a class containing the child to be assessed and in step 120 uses the window 116 to select the child to be assessed. After selection of the child, step 122 displays a list 124 of the goals of the selected activity and the achievement status of these goals by the selected child. Then clicking on the start button 128 calls the third portion (start) 130, FIG. 9, of the assessment procedure.

The selected animation activity is downloaded, if on the internet, and an initial screen (not shown) with another start activity button (not shown). Then in step 132 the procedure determines if the user has clicked on the start activity button and, if true, proceeds to step 134 where the activity is played. Playing the activity results in animated display of a cartoon in the upper portion of the display which contains a plurality of components which are readily recognizable by a preschool age child. For example the screens of FIGS. 10-15 contain scenes from separate animated acts in an activity call "Guess the Action" containing components including cartoon characters 140 (Argus the alligator) and 142 (Belle the bunny), play items such as balls 144 and 146, other items such as square 148, pizza 150, glass of ice 152, red shirt 154, blue shirt 156, desk 158 and bunk bed 160. In step 162 the instructor guides the child in the activity. On the lower portion of the screen a written instruction 164 is displayed for providing instruction and guidance to the instructor while monitoring or helping the child.

During play of each act, the vocal story requests selection of one of the displayed components which have a predefined aspect related to a goal being assessed. For example in the scene of FIG. 10, selection of the character standing on something square is requested. The program activates screen regions on the characters as buttons which can be clicked or alternatively touched in the case a touch screen is used and waits until a selection is made. Use of the mouse 40 to move the pointer 166 and clicking on the character standing on the square 148 by the child or by the instructor in response to the child pointing to the character indicates that the child has achieved an understanding of the word "square". In the scenes of FIGS. 11-15 the understanding of other words or aspects are assessed; in FIG. 11—"hot", in FIG. 12,—"blue", in FIG. 13—"next to", in FIG. 14—"behind", and in FIG. 15—"bottom". Following the play and completion of selections in the scenes of the activity, step 170 displays the window 172 in FIG. 16 which displays the results of the assessment activity just played. Correct selection of the displayed components having the requested predefined aspects in the scenes of FIGS. 10-15 results in the indication that the goals of the activity have been achieved, i.e. "learned". Incorrect selection of one or more components results in an indication that one or more goals of the activity have not been achieved i.e., "not learned".

The combination of the display of an assessment activity by the computer on a first portion of the screen in a format such as a cartoon which is attractive to preschool children with the display of written instructions for the teacher on a second portion of the screen provides for the unique interaction between a child and the teacher resulting in improved learning by the child. The child is readily instructed in the use of the mouse and can independently perform the activity after learning its use. The teacher by reading the written instructions is assisted in providing guidance, such as repeating a request, to a child.

Referring back to FIG. 9, step 174 permits the instructor to request repeating the assessment activity, steps 134, 162 and 170 so that multiple children can be assessed using the same assessment activity. Step 176 responds to clicking on an exit button (not shown) to return the program to the procedure of FIG. 7.

Figure 17:
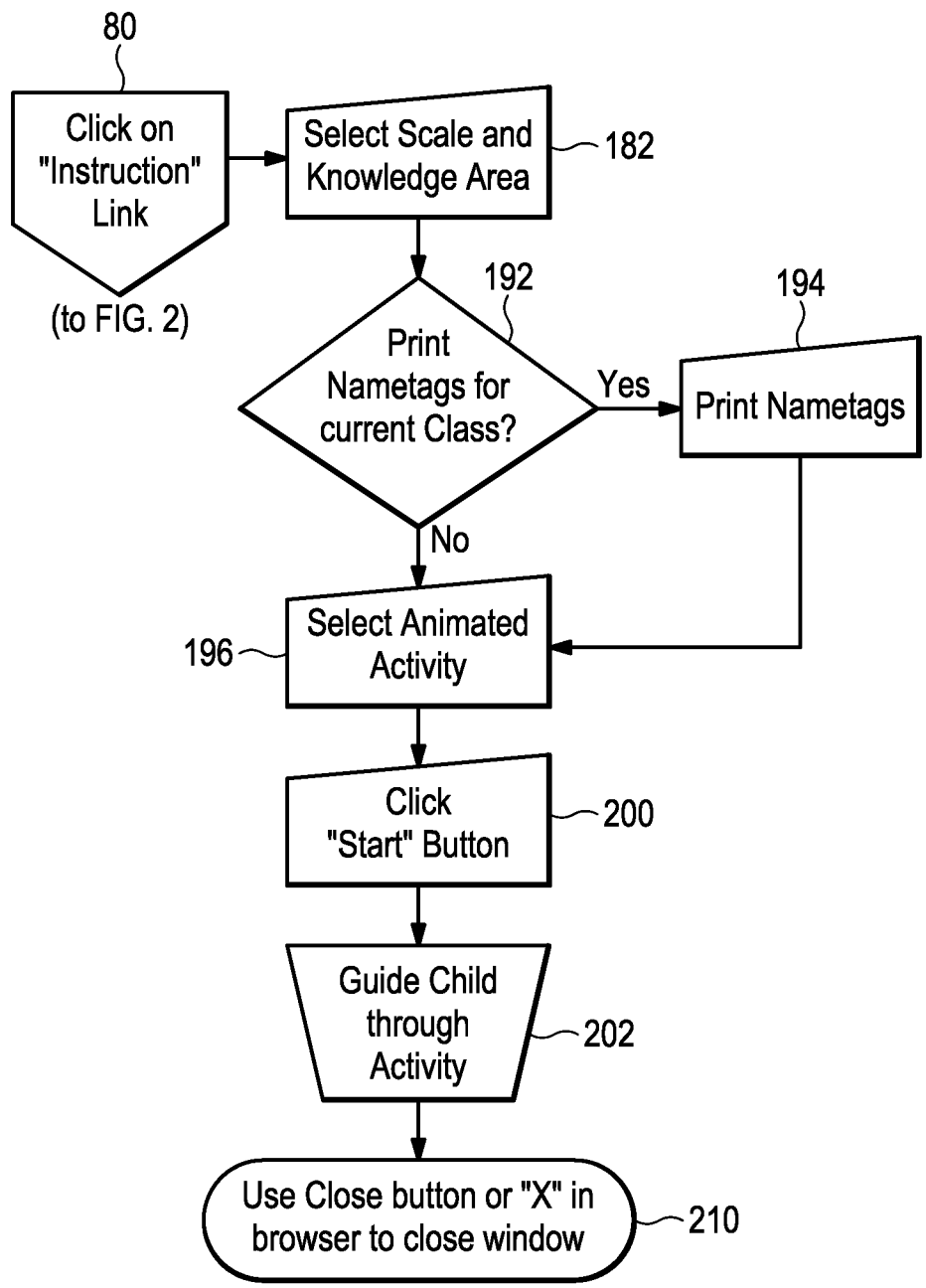
FIG. 17 is a step diagram of an instruction procedure called by the program of FIG. 2.

When the instruction button 68 of FIG. 3 is selected, the procedure of FIG. 17 is called and the window 180 of FIG. 18 is displayed. In step 182, a scale and a knowledge area are selected using the scale select window 184 and the knowledge area select window 186 which results in the display of a listing 188 of the instruction activities relating to the selected scale and knowledge area. Step 190 provides to the selection of a print name tag button 192 calling a name tag printing procedure 194. An instruction activity is selected from the list 188 in the step 196 by clicking on a check box 198 associated with the selected activity. Similar to the assessment activities, the animated cartoon of the instruction activity is accessed or downloaded if on the internet and an initial screen with a start or play button is displayed. Clicking on the start button, step 200, plays the cartoon. The instruction activity can have interactive portions similar to assessment activities or can be simply instructive. Instructional activities can be played individually or by a class or group of children. Guidance for the instructor can also be displayed on the screen, step 202, in promoting interaction with a child or children.

Figure 19:
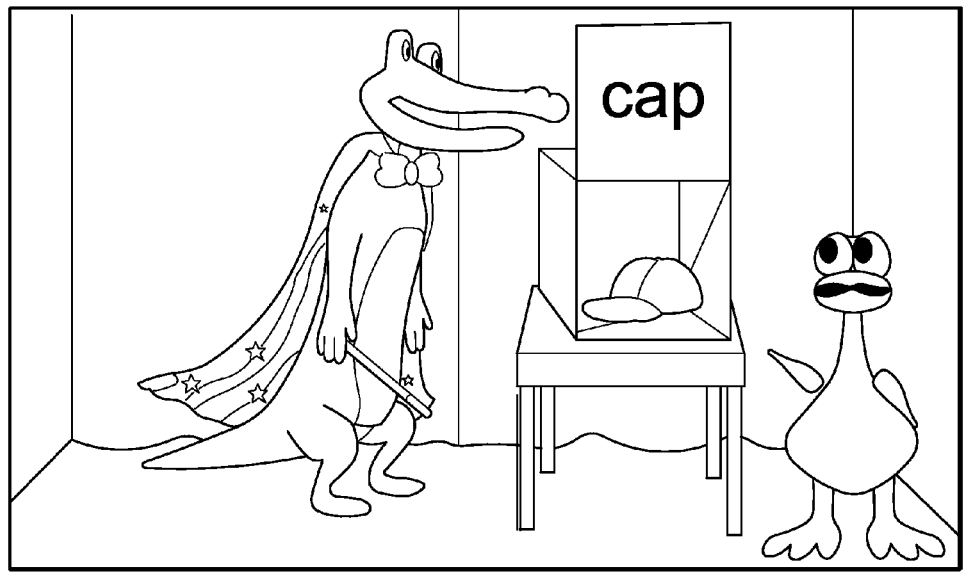
FIG. 19 is a view of a first screen display during operation of an instruction activity called in the instruction procedure of FIG. 17.
Figure 20:
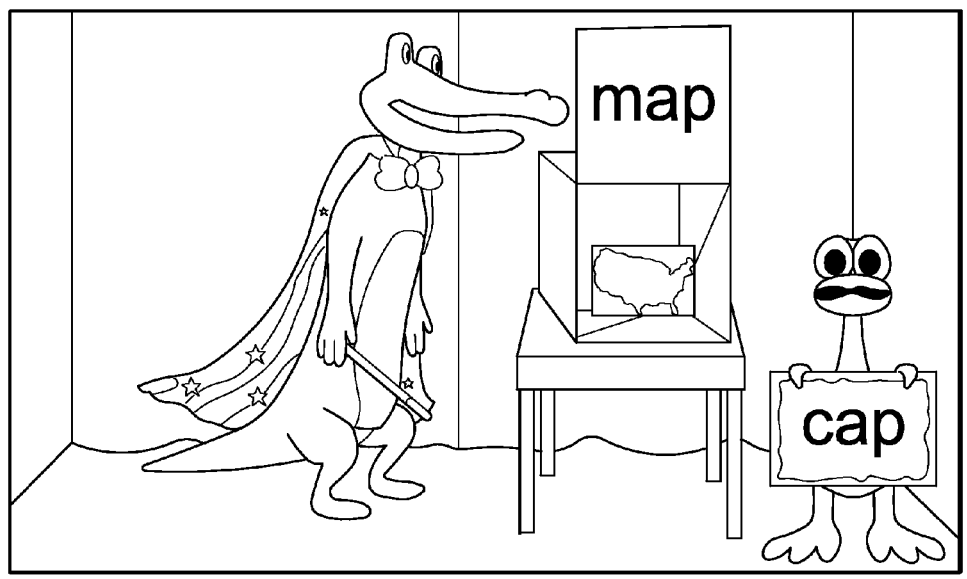
FIG. 20 is a view of a second screen displayed during the operation of the instruction activity of FIG. 19.
Figure 21:
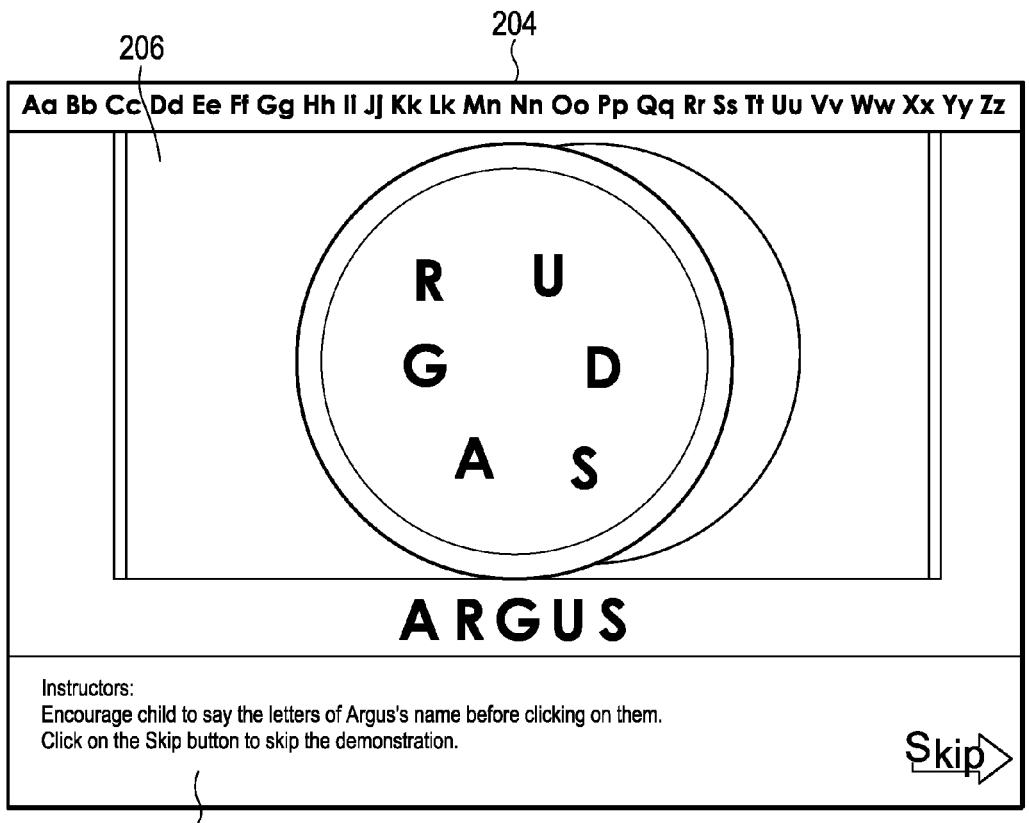
FIG. 21 is a view of a screen displayed during another instruction activity.

Scenes of FIGS. 19 and 20 illustrate an instructional activity relates to the use of letters to form words. In the first scene of FIG. 19 the vocal story describes the magician Argus magically displaying the word "cap" on the front side of a box. Sliding the front side upward shows a cap inside the box. The story requests that each letter, successively highlighted, be clicked on by a child or instructor, whereupon the phonetic sound of the letter is broadcast on the speaker. Then in the second scene of FIG. 20 the story tells of Argus magically changing the letter "c" to "m". Again the story requests clicking on each letter of the new word and broadcasts the phonetic sounds of each letter followed by raising the front side and display of a map inside the box.

A screen 204 of another instruction activity shows the upper portion 206 where a cartoon shows a plate with letters to be selected by the child to form a word or name. A lower portion 208 of the screen contains written instructions for the instructor in promoting learning and interaction with the child.

Step 210 in FIG. 17 illustrates that the user can click on the close button in any window to close that window.

The above description of detailed description of the invention and the accompanying drawings are only illustrative of one embodiment of the invention and only illustrate a small portion of an extensive library of assessment activities and instruction activities. Many modifications, changes in detail and variations can be devised without departing from the scope and spirit of the invention.

It will be obvious to those having skill in the art that many changes may be made to the details of the above-described embodiments without departing from the underlying principles of the invention. The scope of the present invention should, therefore, be determined only by the following claims.

The invention claimed is:

1. A computer implemented system comprising:
a pre-school level assessment computer program stored in a non-transitory machine readable memory, the computer program executable on a processor of the computer system so as to realize the steps of—
interacting with a teacher user, using the computer system interface features, to select a knowledge area for assessment of a pre-school student;
playing a cartoon story associated with the selected knowledge area, the cartoon story including a plurality of displayed components recognizable by a pre-school student on the display screen along with an accompanying vocal story on the speaker;
further playing an accompanying voice message that requests a user to select one of the displayed components;
concurrently with the cartoon story, displaying textual guidance for a teacher user on a display screen of the computer system, the textual guidance including display of the text of the voice message to enable the teacher user to assist a student user by the teacher repeating the text of the voice message; and
wherein the cartoon and story is configured to display and pronounce words and letters in the words, and assess the student's understanding of how changes in a letter of a word changes the word to a different word.

2. The system of claim 1 wherein the computer program is further configured to realize the steps of, responsive to selection of a knowledge area for assessment, displaying a list of animated activities that assess at least one goal in the selected knowledge area, and further displaying, for each of the listed animated activities, at least one corresponding goal that the activity is designed to assess, to support teacher selection of an animated activity based on a desired goal.

3. The system of claim 2 wherein at least one of the list of animated activities is designed to assess the pre-school student's understanding of pronouns.

4. The system of claim 2 wherein at least one of the list of animated activities is designed to assess the pre-school student's understanding of action words.

5. The system of claim 2 wherein at least one of the list of animated activities is designed to assess the pre-school student's understanding of negative words.

6. The system of claim 2 wherein at least one of the list of animated activities is designed to assess the pre-school student's understanding of positional words.

7. The system of claim 2 wherein at least one of the list of animated activities is designed to assess the pre-school student's understanding of words that describe qualities of physical objects.

8. The system of claim 2 wherein at least one of the list of animated activities is designed to assess the pre-school student's understanding of past and future tenses.

\* \* \* \* \*